Patented Sept. 19, 1922.

1,429,407

UNITED STATES PATENT OFFICE.

EARL L. CODDINGTON, OF MIDDLETOWN, OHIO, ASSIGNOR OF ONE-HALF TO GEORGE D. C. CODDINGTON, OF WEST MIDDLETOWN, OHIO.

SEALING COMPOSITION.

No Drawing.  Application filed August 7, 1920. Serial No. 401,981.

*To all whom it may concern:*

Be it known that I, EARL L. CODDINGTON, a citizen of the United States, residing at Middletown, in the county of Butler and State of Ohio, have invented a new and useful Sealing Composition, of which the following is a specification.

This invention relates to compositions for sealing gasket seats and oil pipe joints and fittings to render them oil-tight.

Automobile repairmen spend much time repairing gaskets on oil and gasoline pipe joints through which the oil or gasoline is constantly seeping. Nearly all gasket materials now in use are either worn out in a short time or destroyed by the action of the oil or gasoline, with resultant leakage. The pressure of the bolts on the gasket flanges is frequently uneven, with the result that the gaskets are compressed on one side to a greater extent than on the other side, which results in leaking and in tearing of the gasket upon removal of the same. Shellac is now in general use for the purpose of sealing oil joints, but this material, if it finds its way into the working parts of the engine, will adhere to the walls of the cylinders, will gather carbon, start the pistons to cutting and scoring, and will get into the bearings of the engine and sometimes do considerable damage. Shellac sometimes gets into the multiple disks of the clutch on some cars, and upon engaging the clutch the friction melts the shellac, and on cooling cements the clutch disks together, preventing it from releasing properly, and thereby sometimes causing serious accidents.

Objects of this invention are to provide a composition which will seal gasket seats, and will render all kinds of oil and gasoline joints and fittings liquid-tight.

A further object of the invention is to provide a composition which, when applied to a gasket or seat, may be squeezed into all the imperfect parts of the gasket and will enter the fibers of the gasket, thus sealing every crevice through which oil might otherwise escape.

A further object is to provide a composition such that if any of it does find its way into the working parts of the engine, no damage will result.

A still further object is to provide a composition which, when used in gasket seats, parts easily from the gasket or seat and prevents the tearing of a worn gasket, thus making it possible to use an old gasket to form a perfect seal therewith.

An additional object is to form a composition which, in tight joints, may be used in the place of a gasket, the composition itself congealing after application into a stiff putty which makes a perfect seal.

These objects are attained by the composition that forms the subject-matter of the present invention. The improved composition is composed of soap, which forms a vehicle, a non-abrasive and preferably mineral substance for giving body to the composition, coloring matter to give a pleasing appearance, and water in sufficient quantity to form a paste of the required consistency. Any soap may be used as the vehicle for the present composition. To provide a body, either talc or ground asbestos may be used. For certain purposes, talc is superior, particularly because it is cheap and because it has a very small percentage of grit. Ground asbestos has the advantage because of its fiber, which helps to bind the cement formed by the composition so that leaks may be stopped much larger than can be stopped by a compound employing talc. Besides these substances, soapstone and white clay have been used with some success, the latter being the kind of clay employed by paper mills.

The use of soap alone is of course old for the purpose of sealing pipe joints. Soap has been tried but is not found to be effective and practicable to seal gaskets or for work around automobile engines. The soap needs a body or filler, preferably a mineral filler, which from a practical standpoint has no grit or abrading action.

One composition which has been used with success was made up of soap, 1 part; talc, 1 part; coloring matter in sufficient quantity to give a pleasing appearance, and water in sufficient quantity to make a paste of the consistency of petroleum jelly. These ingredients are boiled together and mixed until even and smooth. Instead of this process, the water and soap may be boiled together and the other ingredients added and mixed afterward, as well as before boiling. The paste is applied to the parts to be sealed by means of a stiff brush, a paddle or putty knife.

When this composition is properly made, it forms a smooth, sticky paste which, when applied to oily surfaces, or to wet surfaces, will adhere to either. It is easily spread and stays in place until the water evaporates out of the composition. When this takes place, the composition becomes hard, and because of the mineral filler employed, a firm strong cement results which fills the fibers of gaskets or cracks or holes in the gaskets, but at the same time never hardens to such a degree that the gasket may not be easily removed from the joint without tearing. To suit different conditions, proportions of talc, asbestos or other body-giving substance may be varied within a wide range. In some cases, there may be 10 parts of talc, asbestos, etc., used with each part of soap.

What is claimed is:—

1. A sealing composition made from soap, a mineral non-abrasive material, and water in sufficient quantity to form a paste of desired consistency.

2. A sealing composition comprising soap, talc, coloring matter, and water in sufficient quantity to form a paste.

3. A sealing composition capable of adhering to wet and oily surfaces, comprising, in combination, soap, talc, and water in sufficient quantity to form a paste substantially of the consistency of petroleum jelly.

4. A sealing composition comprising soap, water, and a non-abrasive substance that will form a parting between the gasket surface and the gasket seat, as well as a seal.

In testimony, that I claim the foregoing as my own, I have hereto affixed my signature.

EARL L. CODDINGTON.